US010071475B2

(12) United States Patent
Lin et al.

(10) Patent No.: US 10,071,475 B2
(45) Date of Patent: Sep. 11, 2018

(54) SMART HOME SYSTEM WITH EXISTING HOME ROBOT PLATFORMS

(71) Applicant: Vivint, Inc., Provo, UT (US)

(72) Inventors: Rongbin Lanny Lin, Orem, UT (US); Brandon Bunker, Highland, UT (US)

(73) Assignee: Vivint, Inc., Provo, UT (US)

( * ) Notice: Subject to any disclaimer, the term of this patent is extended or adjusted under 35 U.S.C. 154(b) by 56 days.

(21) Appl. No.: 14/530,143

(22) Filed: Oct. 31, 2014

(65) Prior Publication Data

US 2016/0121479 A1    May 5, 2016

(51) Int. Cl.
| | |
|---|---|
| *B25J 9/00* | (2006.01) |
| *E05F 1/00* | (2006.01) |
| *B25J 9/16* | (2006.01) |
| *B25J 13/00* | (2006.01) |
| *B25J 13/08* | (2006.01) |
| *B25J 11/00* | (2006.01) |
| *G05D 1/02* | (2006.01) |
| *E05F 15/611* | (2015.01) |

(52) U.S. Cl.
CPC .......... *B25J 9/0003* (2013.01); *B25J 9/1679* (2013.01); *B25J 11/008* (2013.01); *B25J 13/006* (2013.01); *B25J 13/08* (2013.01); *E05F 1/002* (2013.01); *G05D 1/0282* (2013.01); *A47L 2201/00* (2013.01); *E05F 15/611* (2015.01); *E05Y 2900/132* (2013.01); *G05B 2219/25011* (2013.01); *G05B 2219/25168* (2013.01); *G05B 2219/2642* (2013.01); *G05B 2219/39001* (2013.01); *G05D 2201/0215* (2013.01); *Y10S 901/01* (2013.01)

(58) Field of Classification Search
CPC ...................... B25J 9/003; B25J 9/1679; B25J 11/008–11/009; B25J 11/003; B25J 13/003; B25J 13/006; B25J 13/08–13/084; B25J 13/088; B25J 13/089; G05B 2219/2642; G05B 13/00–13/048; G05B 15/02; G05B 19/048
See application file for complete search history.

(56) References Cited

U.S. PATENT DOCUMENTS

| | | | |
|---|---|---|---|
| 6,909,921 B1 | 6/2005 | Bilger | |
| 8,095,238 B2 * | 1/2012 | Jones | ........................ B25J 5/007 180/168 |
| 8,755,936 B2 * | 6/2014 | Friedman | ................ G08C 17/00 700/248 |

(Continued)

OTHER PUBLICATIONS

In-Kyu Sa et al., "Intelligent Robot Systems Based on PDA for Home Automation Systems in Ubiquitous", Cutting Edge Robotics 2010, Verdran Kordic.*

(Continued)

*Primary Examiner* — Adam R Mott
(74) *Attorney, Agent, or Firm* — Holland & Hart LLP

(57) ABSTRACT

Methods and systems are described for communicating action instructions between a home automation system and a mobile robotic device. In some embodiments, the action instructions may be communicated by receiving, at the home automation system, input data, and processing the input data to obtain action instructions. In some embodiments, the action instructions may be communicated to the mobile robotic device, and the mobile robotic device may execute the received action instructions.

18 Claims, 8 Drawing Sheets

(56) References Cited

U.S. PATENT DOCUMENTS

| | | | |
|---|---|---|---|
| 2002/0014953 A1 | 2/2002 | Stephens et al. | |
| 2005/0064916 A1 | 3/2005 | Ozluturk et al. | |
| 2007/0112463 A1* | 5/2007 | Roh | B25J 9/1656 700/245 |
| 2011/0238234 A1* | 9/2011 | Chen | A62C 3/00 700/295 |
| 2013/0263034 A1 | 10/2013 | Bruck et al. | |
| 2014/0031977 A1* | 1/2014 | Goldenberg | B25J 9/08 700/245 |
| 2014/0046462 A1 | 2/2014 | Mets | |
| 2014/0207282 A1* | 7/2014 | Angle | H04L 12/282 700/257 |
| 2014/0254896 A1 | 9/2014 | Zhou et al. | |
| 2015/0120015 A1 | 4/2015 | Fadell et al. | |
| 2015/0120596 A1 | 4/2015 | Fadell et al. | |
| 2015/0145643 A1 | 5/2015 | Fadell et al. | |
| 2015/0156031 A1 | 6/2015 | Fadell et al. | |
| 2015/0310381 A1 | 10/2015 | Lyman et al. | |

OTHER PUBLICATIONS

H. S. Ahn, I. K. Sa and J. Y. Choi, "PDA-based mobile robot system with remote monitoring for home environment," in IEEE Transactions on Consumer Electronics, vol. 55, No. 3, pp. 1487-1495, Aug. 2009.*
PCT International Search Report for International Application No. PCT/US2015/056939, dated Mar. 25, 2016 (3 pp.).
Zak Ud Din et al., "Home Automation with Smart Robot Featuring Live Video Feed and Remotely Controlled Switches," 2013 IEEE Conference on Sustainable Utilization and Development in Engineering and Technology (CSU DET), May 30, 2013-Jun. 1, 2013, pp. 1-6. (http://ieeexplore.ieee.org/xpl/articleDetails.jsp?arnumber=6670975).
Thibodeaux, "Riley—An Inexpensive Home Security Robot", Home Alarm Report, http://homealarmreport.com/riley-inexpensive-home-security-robot/, published May 10, 2016.
Extended European Search Report for EP Application No. 15855021.0, dated Jun. 12, 2018.

* cited by examiner

SMART HOME SYSTEM WITH EXISTING HOME ROBOT PLATFORMS

BACKGROUND

Existing home robotic systems provide users with a number of useful services, most commonly including automated vacuuming or lawn mowing performed by a mobile robotic device. The potential applications of these home robotic systems are plentiful, yet existing home robot platforms are often limited to direct user input, preset schedules, and particularly designated functionalities. For example, automated vacuuming robots are limited to vacuuming functionalities, and may only operate based on strict user inputted schedules.

As many homes and businesses are increasingly using smart home systems to monitor occupancy, temperature, and a number of other building parameters, it may be useful to provide a means for linking these smart home systems to existing mobile robot platforms such that additional home or business functionalities may be carried out by the robotic systems. Additionally, it may be beneficial to provide a means by which operation schedules for existing mobile robot platforms may be set or updated based on relevant home or property parameters, such as occupancy status, without the need for user input. For example, users may wish to limit vacuuming functionality of an automated vacuum robot system to periods of time during which the house is unoccupied. While preset scheduling functions may allow for this functionality in many instances, preset schedules may not account for unscheduled user arrivals or departures. By providing communication means between occupancy monitoring systems already in place in smart home systems and existing home robot platforms, users may be able to direct a vacuuming robot, for example, to vacuum the house only when the home is determined to be unoccupied and to return to a base or charging station before the user returns, regardless of the time at which the house is unoccupied or for what duration of time the house remains unoccupied. In this way, the integration of existing smart home systems with existing home robot platforms may serve to increase the functionality of the systems to provide additional useful features to users.

SUMMARY

Methods and systems are described for communicating action instructions between a home automation system and a mobile robotic device. In some embodiments, input data may be received at the home automation system, and the input data may be processed at the home automation system to obtain action instructions. The action instructions may then be communicated to the mobile robotic device, and the mobile robotic device may execute the received action instructions accordingly. The input data received at the home automation system may in some embodiments include user inputted data, while in other embodiments, the input data may include home security, occupancy or other property-related data received from one or more sensors in communication with the home automation system. Such property-related data may include occupancy data, or may include data collected from any one of a microphone, a motion detector, a climate detector, a touch sensor, an optical sensor, a voice recognition sensor, a security camera, a mobile device, or combinations thereof.

Upon receiving the communicated action instructions, the mobile robotic device may be operable to perform a plurality of actions, including actions for which the mobile robotic device was not originally designed. For example, the action instructions executed by the mobile robotic device may be selected from any one of opening a barrier of a home or building, vacuuming, mowing a lawn, activating or deactivating an alarm clock, relocating to the source of an alarm, activating video and/or audio recording or communication, and locating an individual or object. The mobile robotic device may further be operable to receive data input directly at the mobile robotic device, such as audio or visual data, and may communicate the data to the home automation system. This communicated data may serve to increase the functionality of the home automation system by providing mobile sensor systems. Additionally, on the basis of the received data, the home automation system may communicate updated action instructions to the mobile robotic device, or may alter parameters of other existing automated home devices, such as a thermostat or sprinkler system. In one embodiment, sensors that may be part of the home automation system, the mobile robotic device, or both, may detect that a number of visitors have visited the home, for example by way of motion or camera sensors, or by door sensors. On the basis of this data, the home automation system may determine that additional vacuuming is required, without any input needed from the user, and may transmit action instructions to the mobile robotic device accordingly.

Some embodiments may include receiving, at the home automation system, one or more data patterns, wherein the data patterns may comprise user patterns of behavior. Using these user patterns of behavior, an operation rule may be obtained based on the one or more data patterns, the operation rule comprising set action instructions. The operation rule may then be communicated to the mobile robotic device, wherein the mobile robotic device may execute the set action instructions comprising the received operation rule. For example, the home automation system may receive data patterns indicative of the user's home arrival patterns, such as every weekday at 5:30 pm. On the basis of these data patterns, the home automation system may obtain an operation rule, specifically that the front door should be opened on weekdays at 5:30 pm. Set action instructions based on the operation rule may be communicated to the mobile robotic device, which may execute the received operation rule by opening the front door on weekdays at 5:30 pm.

In some embodiments, the operation rule and/or action instructions may be updated based on updated input data received at the home automation system or the mobile robotic device, such that the mobile robotic device may execute the updated action instructions. In the example provided above, the operation rule may be updated based on data received, for example, from a motion detector or security camera indicating that the user has not yet arrived home at 5:30 pm, such that the mobile robotic device may be instructed not to open the front door until further action instructions are received. In this way, home safety may be ensured, and the mobile robotic device may be operable to perform functions beyond the scope of a preset schedule.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized with reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

Figure 1:
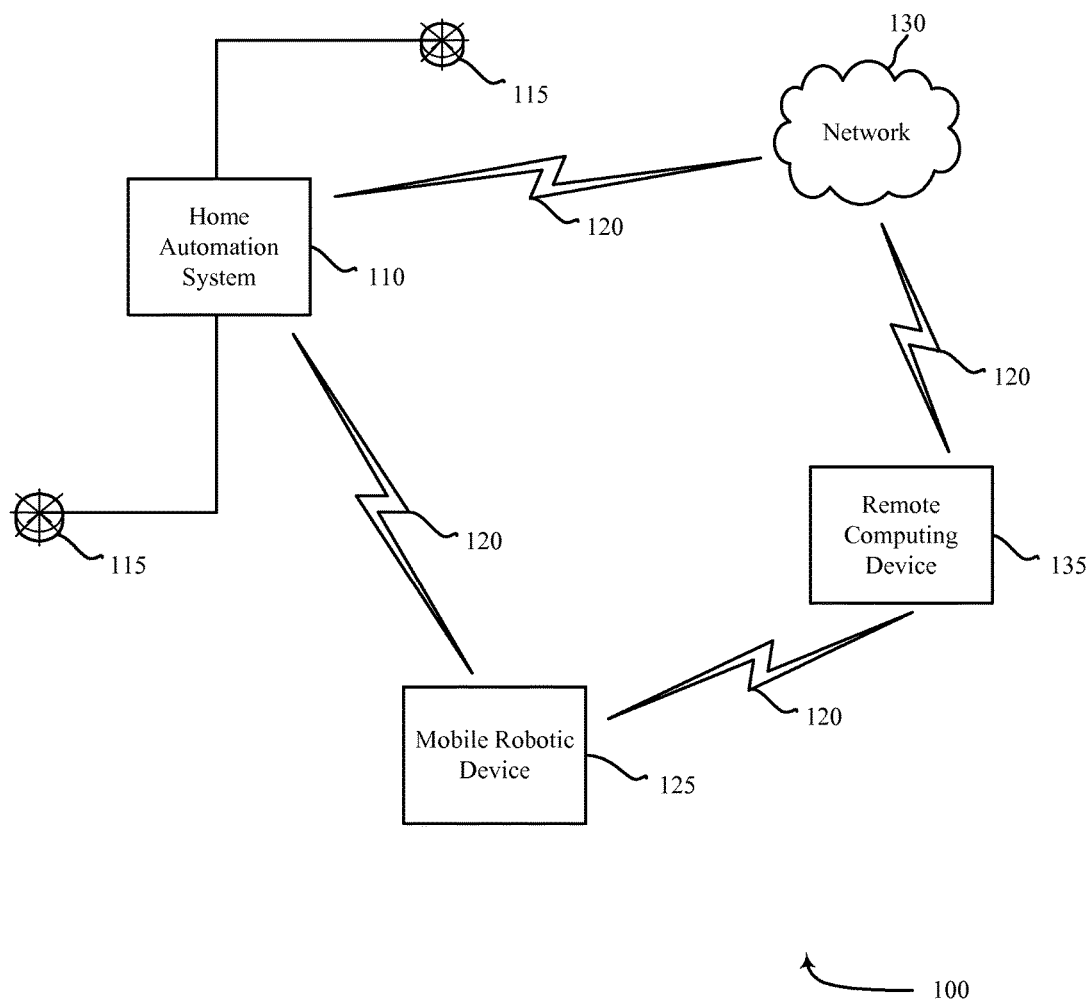
FIG. 1 is a block diagram of an example mobile robotic device communication system in accordance with various embodiments.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein may relate to facilitating communication between a home automation system and a mobile robotic device. More specifically, the systems and methods described may relate to a means for monitoring home automation data and obtaining action instructions therefrom, and communicating the action instructions to the mobile robotic device for execution.

Additionally, it may be advantageous to provide a means for utilizing existing home robot platforms to perform tasks not originally intended by the manufacturer, without the need for costly or complicated installation of processing systems on the robots. For example, an existing home vacuuming robot may be integrated with a smart home system in order to receive action instructions from the smart home system that enhance the robot's operability beyond merely vacuuming. Because the action instructions may be originated at the smart home system, and in view of already existing wireless receiving capabilities in the vacuuming robot platform, limited retrofitting of the robot, such as with costly processors, may be required. This may provide an ease of use and conservation of cost for the consumer, while still achieving increased functionalities for existing smart home systems and home robot platforms.

FIG. 1 is a block diagram illustrating one embodiment of a mobile robotic device communication system 100 in which the present systems and methods may be implemented. In some embodiments, the mobile robotic device communication system 100 may include a home automation system 110, one or more sensor units 115, a mobile robotic device 125, a network 130, and a remote computing device 135. The home automation system 110 may communicate via wired or wireless communication links 120 with one or more of the mobile robotic device 125 and the network 130. The network 130 may communicate via wired or wireless communication links 120 with the remote computing device 135. In alternate embodiments, the network 130 may be integrated with the remote computing device 135, such that separate components are not required.

Although defined as a home automation system, component 110 may alternatively comprise a business automation system or any other system operable to monitor and control parameters for buildings or properties.

Home automation system 110 may be operable to both control aspects of a property as well as to receive and display notifications regarding monitored activity of a property. Examples of the home automation system 110 may include a dedicated home automation computing device (e.g., wall-mounted controller), a personal computing device (e.g., laptop, desktop, etc.), a mobile computing device (e.g., tablet computing device, smartphone, etc.), and the like.

Examples of the sensor units 115 may include any one of a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, voice sensor, and the like. Sensor units 115 may represent one or more separate sensors or a combination of two or more sensors in a single sensor device. For example, sensor unit 115 may represent one or more camera sensors and one or more motion sensors connected to home automation system 110. Additionally or alternatively, sensor unit 115 may represent a combination sensor such as both a camera sensor and a motion sensor integrated in the same sensor device. Although sensor units 115 are depicted as connecting directly to home automation system 110, sensor units 115 may alternatively connect to home automation system 110 via a wired or wireless connection link 120, or via network 130. Additionally or alternatively, sensor units 115 may be integrated with a home appliance or fixture such as a light bulb. In some embodiments, sensor unit 115 may include an accelerometer to enable the sensor unit 115 to detect a movement. In some embodiments, sensor unit 115 may include a wireless communication device enabling sensor unit 115 to send and receive data and/or information to and from one or more devices. Additionally or alternatively, sensor unit 115 may include a GPS sensor to enable sensor unit 115 to track a location of sensor unit 115. Sensor unit 115 may include a proximity sensor to enable sensor unit 115 to detect proximity of a person relative to a predetermined distance from a dwelling (e.g., geo-fencing). In some embodiments, sensor unit 115 may include one or more security detection sensors such as, for example, a glass break sensor, a motion detection sensor, or both. Additionally or alternatively, sensor unit 115 may include a smoke detection sensor, a carbon monoxide sensor, or both.

Mobile robotic device 125 may be any existing mobile robotic device available for use in home or business applications. For example, mobile robotic device 125 may include an iRobot Roomba®, Scooba®, Braava®, 110 FirstLook®, or Ava®, or a Husqvarna Automower®. In order to receive action instructions and/or input data, the mobile robotic device 125 may be retrofitted with a wired or wireless transceiver (not shown), as well as one or more sensor units (not shown). Alternatively, in mobile robotic devices already having Wi-Fi or other communication capabilities, an additional transceiver may not be necessary. With the addition of these components, existing mobile robotic devices 125 may become operable to receive action instructions from home automation system 110 or remote computing device 135, and may additionally be operable to receive and process input data from one or more sensors positioned on or integrated with the mobile robotic devices 125. The mobile robotic device 125 may forward the sensed data to the home automation system 110, such that the home automation system 110 may provide updated action instructions to the mobile robotic device 125. Alternatively, the mobile robotic device 125 may receive input data from the one or more sensors positioned on or integrated with the mobile robotic device 125, and may obtain and execute action instructions locally based on input data, without the need for interaction with the home automation system 110.

In some embodiments, mobile robotic device 125 may communicate input data received from one or more sensors positioned on the mobile robotic device 125 to the home automation system 110 or remote computing device 135 in real-time such that a user may make decisions regarding action instructions accordingly. For example, a Roomba® having a video camera attached thereon may send video data to a user's smart phone showing that a room is badly cluttered, such that the user may elect not to vacuum the room at that time, and may send action instructions to the Roomba® directing the mobile robotic device 125 to terminate any scheduled vacuuming operations and return to its designated base or charging station. In some embodiments, input data from sensors positioned on the mobile robotic device 125 may be transmitted to the home automation system 110 at the initiative of the mobile robotic device 125, or in other embodiments the home automation system 110 may request transmission of input data from the mobile robotic device 125.

In other embodiments, a user or home automation system 110 may communicate action instructions to a mobile robotic device 125 beyond the operability of the mobile robotic device's 125 original manufacturer-selected functionalities. For example, upon receiving an alert at the home automation system 110 via one or more sensor units 115 that a window has been shattered, home automation system 110 may communicate an action instruction to an Automower® fitted with a video camera or motion detector to relocate to the source of the broken window and collect any relevant data, such as video or movement data indicating that a burglar is entering the home, and convey that data to the home automation system 110 or remote computing device 135.

In some embodiments, multiple existing robotic platforms may be used in concert. For example, a Life Alert® signal received at home automation system 110 or remote computing device 135 indicating that, for example, an elderly home occupant has fallen, may prompt an action instruction. The action instruction may be communicated to, for example, a 110 FirstLook® mobile robotic device 125 having a heartbeat sensor, breathing sensor, brain wave sensor, movement sensor, voice sensor, video camera or the like to move throughout the home or property to locate the source of the alert and convey any relevant occupant vital data to the home automation system 110 or remote computing device 135. In other embodiments, the mobile robotic device 125 may be sent to investigate the condition of a home occupant based on motion sensor data, rather than requiring a Life Alert® signal to be activated. For example, a motion sensor may detect that an occupant has not moved from a position for over a predetermined period of time, such that injury is suspected, and may subsequently prompt an action instruction in a mobile robotic device 125 to relocate to the occupant and gather relevant data about the occupant's condition, to be conveyed to the home automation system 110 or remote computing device 135.

In some embodiments, existing mobile robotic devices 125 may be used in concert with existing home devices, fixtures, or appliances by transmitting commands via wireless signals to the devices, appliances, or fixtures. For example, a mobile robotic device 125 may navigate to within Bluetooth range of a device having Bluetooth connectivity, and may turn the device, such as a speaker system, off or on via Bluetooth-transmitted commands. In other examples, a mobile robotic device 125 may transmit a command to, for example, a television via a WiFi connection to turn off or on. While existing smart home systems may be operable to perform the latter task, in areas of the home that might be WiFi "dead zones," the mobile robotic device may be operable to extend the WiFi functionality of the smart home system.

In further embodiments, existing mobile robotic devices 125 having speakers and/or microphones may be used in conjunction with action instructions communicated from home automation system 110 or remote computing device 135 to serve as mobile intercom systems or alarm clocks, wherein the action instructions may send the mobile robotic device 125 to a child's room to wake the child up by playing music or other sounds. In this way, the functionality of existing mobile robotic devices may be extended beyond their original manufacturer-selected capabilities to provide a multitude of useful services to users via a home automation system 110 or remote computing device 135.

Remote computing device 135 may be a custom computing entity configured to interact with sensor units 115 via network 130. In other embodiments, remote computing device 135 may be a general purpose computing entity such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

In some embodiments, the one or more sensor units 115 may be sensors configured to conduct periodic or ongoing automatic measurements related to home security, environment, occupancy, or other relevant property-related data. Each sensor unit 115 may be capable of sensing multiple home security, environment or occupancy data parameters, or alternatively, separate sensor units 115 may monitor separate home data parameters. For example, one sensor unit 115 may detect occupancy data via a motion detector and/or security camera, while another sensor unit 115 (or, in some embodiments, the same sensor unit 115) may detect climate via a moisture sensor or UV sensor.

Data gathered by the one or more sensor units 115 may be communicated to the home automation system 110, which may be, in some embodiments, a thermostat or other wall-mounted input/output display. The home automation system 110 may process the data received from the one or more sensor units 115 to obtain action instructions. In alternate embodiments, a user may input data directly at the home automation system 110 or at remote computing device 135, such that action instructions may be obtained based wholly or in part on user inputted data. Action instructions obtained at the home automation system 110 may then be communicated via a wired or wireless communication link 120 to the mobile robotic device 125 or to the network 130. Action instructions communicated to network 130 may be communicated via wired or wireless communication link 120 to remote computing device 135, and may in turn be communicated to mobile robotic device 125 via wired or wireless communication link 120. Action instructions received at mobile robotic device 125 may then be executed by mobile robotic device 125. In some embodiments, described in more detail below, inputted data may also be collected by mobile robotic device 125 and may be communicated via wired or wireless communication link 120 to remote computing device 135 and/or home automation system 110.

In some embodiments, home automation system 110 may communicate with remote computing device 135 via network 130. Examples of networks 130 include cloud networks, local area networks (LAN), wide area networks (WAN), virtual private networks (VPN), wireless networks (using 802.11, for example), and/or cellular networks (using 3G and/or LTE, for example), etc. In some configurations, the network 130 may include the Internet. In some embodiments, a user may access the functions of home automation system 110 from remote computing device 135. For example, in some embodiments, remote computing device 135 may include a mobile application that interfaces with one or more functions of home automation system 110.

Figure 2:
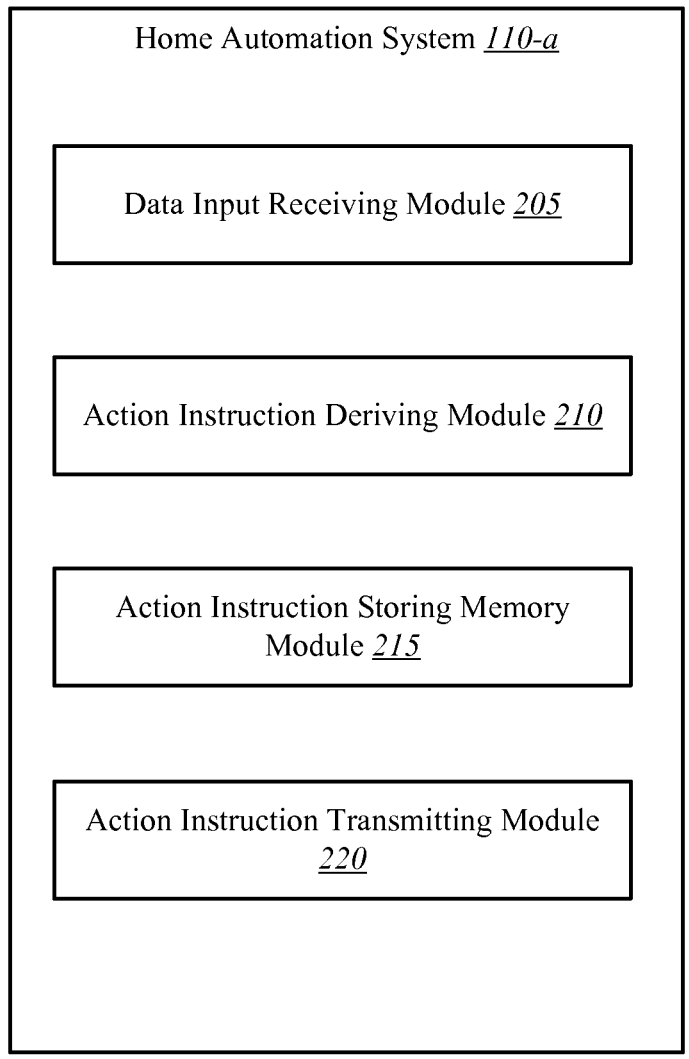
FIG. 2 is a block diagram of one example of a home automation system of the system of FIG. 1.

FIG. 2 shows a block diagram 200 that includes home automation system 110-a, which may be an example of one or more aspects of home automation system 110 of FIG. 1, for use in receiving input data and communicating action instructions derived based on the inputted data to the mobile robotic device 125 of FIG. 1. In some examples, home automation system 110-a may include a data input receiving module 205, an action instruction deriving module 210, an action instruction storing memory module 215, and an action instruction transmitting module 220. Each of these components may be in communication with each other.

The components of home automation system 110-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structure/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Home automation system 110-a may be configured to receive data relating to home security, environment, occupancy, or other data relevant to the home or property via data input receiving module 205. As described above with reference to FIG. 1, home security, environment, occupancy or other relevant property data may be collected by one or more sensor units 115, and may be communicated to data input receiving module 205. Alternatively or in addition, home security, etc. data may be inputted directly by the user into the home automation system 110-a via data input receiving module 205, or may be inputted at remote computing device 135 and communicated to data input receiving module 205 via wired or wireless communication link 120 and network 130, as shown in FIG. 1. In some embodiments, described in more detail below, data may be received at data input receiving module 205 from mobile robotic device 125 via wired or wireless communication link 120. In some embodiments, one or more data patterns comprising user patterns of behavior may be received at data input receiving module 205. Again, the data patterns may be received from one or more sensor units 115, or may be inputted directly by the user into the home automation system 110-a at data input receiving module 205, or alternatively may be inputted at remote computing device 135 and may be communicated to data input receiving module 205 via wired or wireless communication link 120 and network 130.

Data received at data input receiving module 205 may be communicated to action instruction deriving module 210, which may derive action instructions based on the received input data. Where one or more data patterns are received at action instruction deriving module 210 from data input receiving module 205, an operation rule may be derived by action instruction deriving module 210, the operation rule comprising set action instructions determined based on the received one or more data patterns. For example, where data input receiving module 205 receives data patterns either via one or more sensor units 115 or via direct user input regarding occupancy, action instruction deriving module 210 may derive an operation rule indicating that robotic alarm clocks should only be activated when users are home during the week, and should remain deactivated when the users are away from home on the weekends.

Action instructions derived by action instruction deriving module 210 may then be communicated to action instruction storing memory module 215. Memory module 215 may include random access memory (RAM) or read-only memory (ROM). Memory module 215 may store computer-readable, computer-executable software (SW) code containing instructions that are configured to, when executed, cause action instruction transmitting module 220 to perform various functions described herein for communicating, for example, action instructions. Alternatively, the software code may not be directly executable by action instruction transmitting module 220, but may be configured to cause the home automation system 110-a (e.g., when compiled and executed) to perform various of the functions described herein.

Action instruction transmitting module 220 may include a modem configured to modulate packets and provide the modulated packets to antennas (not shown) for transmission, and to demodulate packets received from the antennas. The transmitting module 220 may, in some examples, be implemented as one or more transmitter modules and one or more separate receiver modules (not shown). The transmitting module 220 may support action instruction-related communications. The transmitting module 220 may be configured to communicate, bi-directionally, via antennas and communication link 120 (as shown in FIG. 1), with, for example, mobile robotic device 125 and/or remote computing device 135 (via network 130). In some embodiments, communications through the transmitting module 220 may be coordinated, at least in part, by a communications module (not shown).

Figure 3:
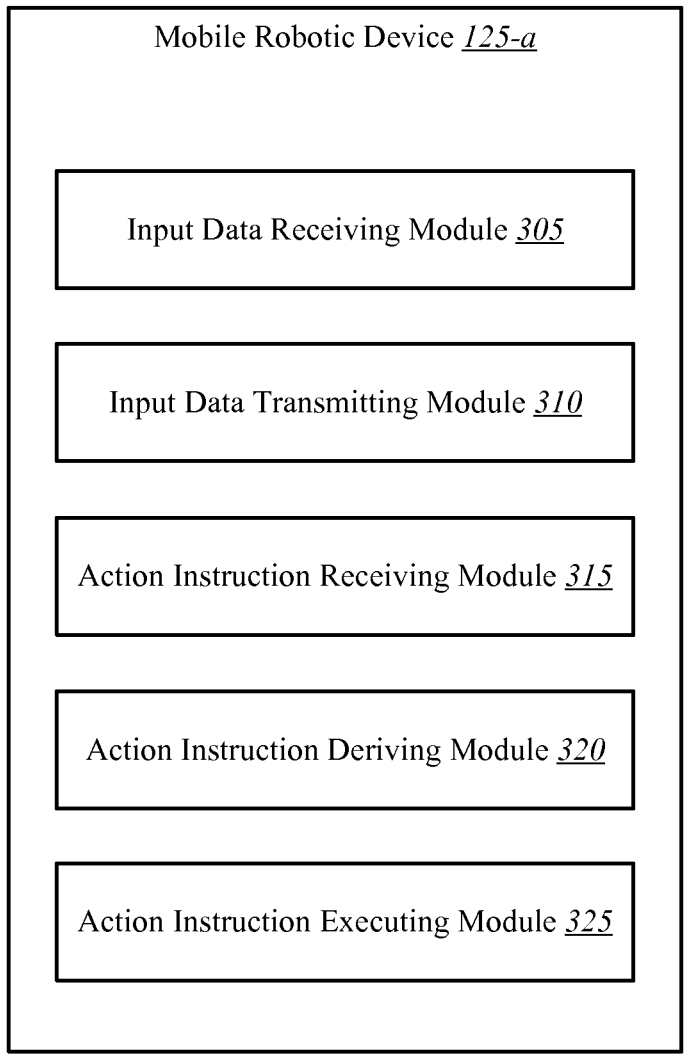
FIG. 3 is a block diagram of an exemplary mobile robotic device as shown in the system of FIG. 1.

FIG. 3 shows a block diagram 300 that includes mobile robotic device 125-*a*, which may be an example of one or more aspects of mobile robotic device 125 of FIG. 1, for use in receiving action instructions communicated from home automation system 110 of FIG. 1 and executing the received action instructions. In some embodiments, mobile robotic device 125-*a* may also be operable to receive inputted data from one or more sensors (not shown) associated with the mobile robotic device 125-*a*, and transmit the inputted data to the home automation system 110 of FIG. 1. In other embodiments, mobile robotic device 125-*a* may be operable to process inputted data to obtain action instructions. In some examples, mobile robotic device 125-*a* may include an input data receiving module 305, an input data transmitting module 310, an action instruction receiving module 315, an action instruction deriving module 320, and an action instruction executing module 325. Each of these components may be in communication with each other.

Input data receiving module 305 may be operable to receive data from a plurality of sensors (not shown) positioned on or integrated with mobile robotic device 125-*a*. For example, mobile robotic device 125-*a* may comprise any one or more of a camera sensor, motion sensor, climate or temperature sensor, audio sensor, carbon monoxide sensor, smoke sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, voice sensor, and the like. Input data receiving module 305 may collect data gathered by the one or more sensors of the mobile robotic device 125-*a*, and may communicate the collected data to input data transmitting module 310. Input data transmitting module 310 may in turn communicate the sensor-gathered data to home automation system 110 of FIG. 1. Home automation system 110 may then process the received data in order to obtain new or updated action instructions.

The new or updated action instructions may then be communicated to mobile robotic device 125-*a* at action instruction receiving module 315. Action instructions received at action instruction receiving module 315 may then be communicated to action instruction executing module 325, which may be configured to implement the action instructions received on the mobile robotic device 125-*a*.

For example, in one embodiment, mobile robotic device 125-*a* may have received at action instruction receiving module 315 action instructions from home automation system 110 of FIG. 1 directing mobile robotic device 125-*a* to mow the lawn. The "mow the lawn" action instructions received at action instruction receiving module 315 may be communicated to action instruction executing module 325, which may initialize the lawn mowing functionality of the mobile robotic device 125-*a*. During the course of carrying out the lawn mowing functionality of mobile robotic device 125-*a*, input data receiving module 305 may receive data from one or more sensors (not shown) on mobile robotic device 125-*a* indicating that it has begun to rain. Data indicating that it is raining may be communicated to input data transmitting module 310, which may transmit the climate data to home automation system 110 of FIG. 1. Home automation system 110 may receive the climate data and may process the data to obtain new or updated action instructions indicating that the mobile robotic device 125-*a* should cease the lawn mowing operation. The action instructions may be communicated to the mobile robotic device 125-*a* via wireless connection link 120 (as shown in FIG. 1), and may be received by action instruction receiving module 315, which may communicate the action instructions to action instruction executing module 325. Action instruction executing module 325 may then terminate the lawn mowing operation of the mobile robotic device 125-*a*. In some embodiments, the mobile robotic device 125-*a* may then return to a designated base or charging station until further action instructions are received.

In alternate embodiments, mobile robotic device 125-*a* may have received at action instruction receiving module 315 action instructions from home automation system 110 of FIG. 1 directing mobile robotic device 125-*a* to mow the lawn. The "mow the lawn" action instructions received at action instruction receiving module 315 may be communicated to action instruction executing module 325, which may initialize the lawn mowing functionality of the mobile robotic device 125-*a*. During the course of carrying out the lawn mowing functionality of mobile robotic device 125-*a*, input data receiving module 305 may receive data from one or more sensors (not shown) on mobile robotic device 125-*a* indicating that it has begun to rain. Data indicating that it is raining may be communicated to action instruction deriving module 320 within the mobile robotic device 125-*a*. Action instruction deriving module 320 may process the received climate data and may obtain a new action instruction indicating that the mobile robotic device 125-*a* should cease the lawn mowing operation. The action instructions may be communicated from the action instruction deriving module 320 to the action instruction executing module 325. Action instruction executing module 325 may then terminate the lawn mowing operation of the mobile robotic device 125-*a*. In some embodiments, the mobile robotic device 125-*a* may then return to a designated base or charging station until further action instructions are received. In this way, data received directly at the mobile robotic device 125-*a* may be utilized to derive new or updated action instructions without interference from the home automation system 110.

Figure 4:
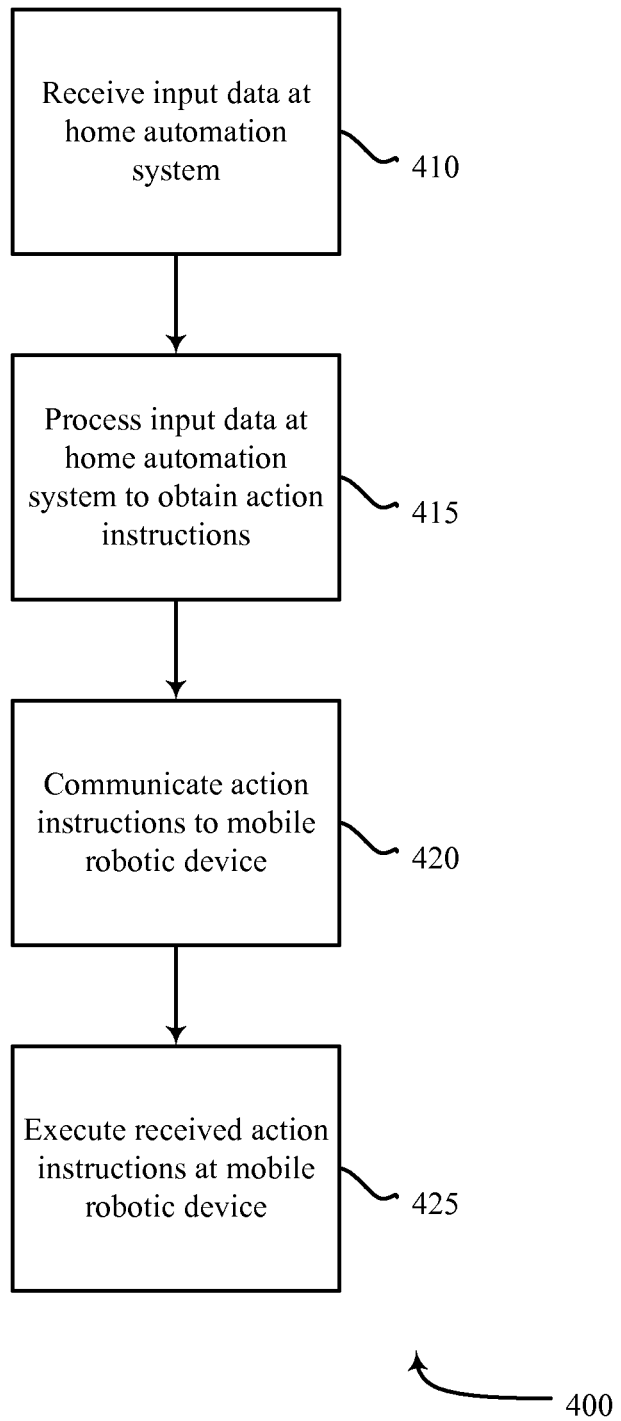
FIG. 4 is a flow diagram illustrating a method for communicating action instructions between a home automation system and a mobile robotic device of FIG. 1 according to various embodiments.

FIG. 4 is a flow chart illustrating an example of a method 400 of communicating action instructions between a home automation system and a mobile robotic device, in accordance with various aspects of the present disclosure. For clarity, the method 400 is described below with reference to aspects of one or more of the home automation system 110, one or more sensors 115, network 130, remote computing device 135, and/or mobile robotic device 125 described with reference to FIGS. 1-3. In some examples, remote computing device 135 and/or mobile robotic device 125 may execute one or more sets of codes to control the functional elements of the remote computing device 135 or mobile robotic device 125 to perform the functions described below.

At block 410, method 400 may include receiving input data at the home automation system. As discussed above, input data may be received via one or more sensors, or may be inputted directly at the home automation device by the user. In other embodiments, the user may input data into a remote computing device, which may communicate the inputted data to the home automation device via a server. Inputted data may comprise any data related to home or property security, environment, occupancy, and the like. In alternate embodiments, inputted data may be received at the home automation device from sensors positioned on or integrated with the mobile robotic device via a wired or wireless communication link.

At block 415, method 400 may include processing the inputted data to obtain action instructions. In some embodiments, action instructions may be obtained individually based on discrete inputted data. In other embodiments, as discussed in more detail below with regard to FIG. 5, one or more data patterns may be received at the home automation system, the one or more data patterns comprising user patterns of behavior, from which set action instructions may be derived.

At block 420, method 400 may include communicating the action instructions to the mobile robotic device. As previously discussed with reference to FIG. 1, action instructions may be communicated directly to the mobile robotic device via wired or wireless communication links. Alternatively, action instructions may be communicated to the mobile robotic device via a server and remote computing device.

At block 425, method 400 may include executing the received action instructions at the mobile robotic device. Executing the received action instructions may include performing an intended function of the mobile robotic device, for example, instructing a mobile vacuuming robotic device to perform a vacuuming function. In other embodiments, executing the received action instructions may include instructing the mobile robotic device to perform functions not originally intended for the device. For example, the action instructions may require the mobile vacuuming robotic device to travel through the house or property to locate an individual or object, or may require the vacuuming robotic device to open a door.

In embodiments in which a mobile robotic device is directed to perform functions not originally intended by the manufacturer, various functional attachment members may be coupled to the mobile robotic device. For example, in embodiments in which a mobile vacuuming robotic device is instructed to open a door, the mobile vacuuming robotic device may be retrofitted with a protruding arm member having a magnet at a distal end, wherein the magnet may be activated or deactivated by the home automation system. The magnet positioned at the distal end of the protruding arm coupled to the mobile robotic device may be magnetically coupled to a magnetic strip installed at the base of a door, such that, upon receiving an action instruction, the mobile robotic device may drive to the door, pull the door open using the magnetic force, and may additionally push the door closed. Although described as a magnetic coupling, the protruding arm member may include any other appropriate coupling means, such as a hook feature.

In a further example, a mobile robotic device may be retrofitted with a protruding arm member providing a pushing or turning operability for the mobile robotic device, such that the mobile robotic device may turn off and on dryers, stoves, and the like.

In another example, an existing mobile lawn mowing robotic device may be retrofitted with a moisture or climate sensor, such that the mobile lawn mowing robotic device may be operable to detect rain and may communicate the climate data either to the home automation system or to the action instruction deriving module within the mobile robotic device itself, as discussed with regard to FIG. 3, in order to obtain new or updated action instructions. For example, a mobile lawn mowing robotic device already in operation mowing the lawn may detect via the one or more climate sensors that it has begun to rain, such that new or updated action instructions may direct the mobile lawn mowing robotic device to terminate the lawn mowing operation and return to its charging station.

Figure 5:
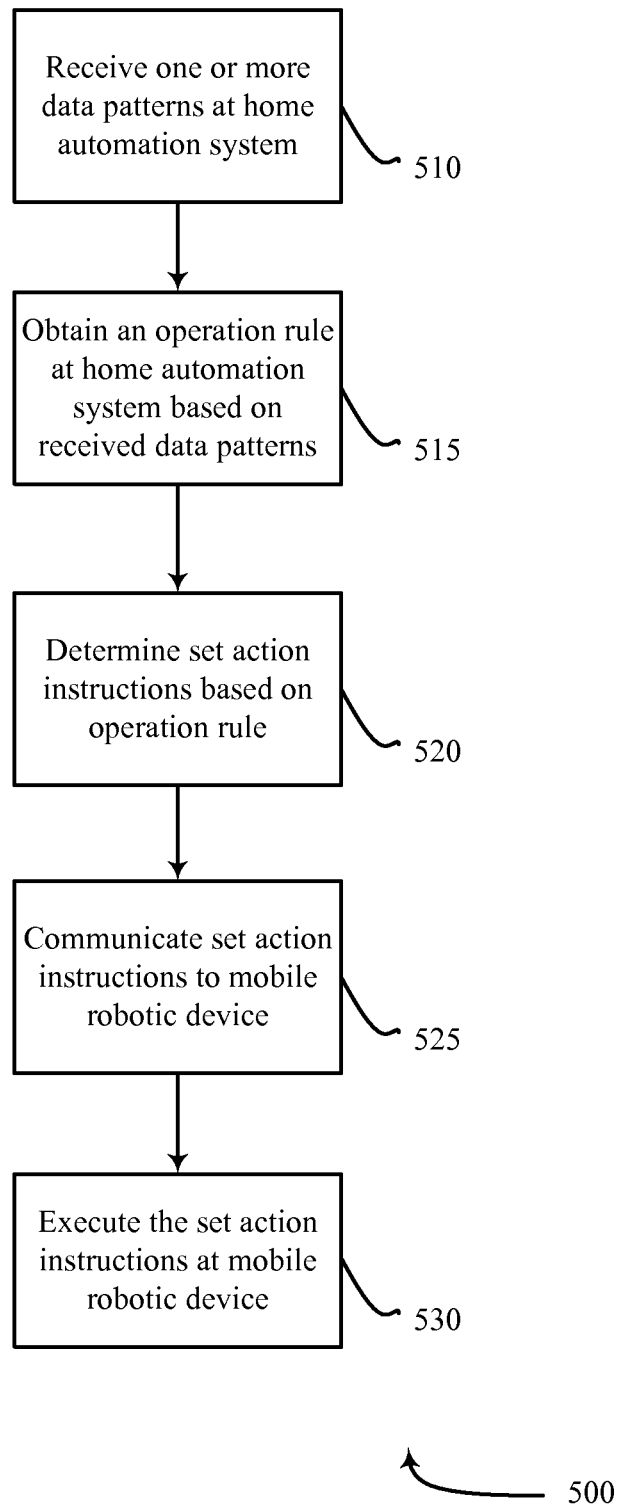
FIG. 5 is a flow diagram illustrating a method for communicating action instructions based on an operation rule between a home automation system and a mobile robotic device of FIG. 1 according to various embodiments.

FIG. 5 is a flow chart illustrating an example of a method 500 of communicating action instructions based on an operation rule between a home automation system and a mobile robotic device, in accordance with various aspects of the present disclosure. For clarity, the method 500 is described below with reference to aspects of one or more of the home automation system 110, one or more sensors 115, network 130, remote computing device 135, and/or mobile robotic device 125 described with reference to FIGS. 1-3. In some examples, remote computing device 135 and/or mobile robotic device 125 may execute one or more sets of codes to control the functional elements of the remote computing device or mobile robotic device to perform the functions described below.

At block 510, the method 500 may include receiving one or more data patterns at the home automation device. As previously discussed, the one or more data patterns may comprise user patterns of behavior. For example, one or more sensor unit comprising any one or more of a motion sensor, camera sensor, heartbeat sensor, etc. may communicate data regarding property occupancy patterns to the home automation system. Occupancy data patterns may indicate, for example, that the property is unoccupied every weekday between 10 am and 5 pm.

At block 515, the method 500 may include obtaining an operation rule based on the received data patterns. In the example provided above, the home automation system may receive data patterns relating to property occupancy, and may accordingly obtain an operation rule based on the received data patterns, the occupancy rule indicating that certain mobile robotic device functionalities, for example, vacuuming or deactivating alarm clocks, should only occur when the property is unoccupied.

At block 520, the method 500 may include determining set action instructions based on the operation rule. Thus, the home automation system may determine set action instructions indicating that vacuuming or alarm clock deactivation, for example, should be executed only on Monday-Friday between 10 am and 5 pm.

At block 525, the method 500 may include communicating the operating rule comprising the set action instructions to the mobile robotic device. As previously discussed, the set action instructions may be communicated from the home automation system to the mobile robotic device via wired or wireless communication links directly, or via a network and remote computing device.

At block 530, the method 500 may include executing the set action instructions at the mobile robotic device. Thus, further to the example above, the mobile vacuuming robotic device may initiate a vacuuming operation at 10 am on Monday morning, and a mobile robotic device may deactivate alarm clocks in the home at 10 am on Monday morning.

In some embodiments, action instructions based upon received input data, and/or set action instructions based upon an operation rule, may be updated based on newly received data at either the home automation system or the mobile robotic device. For example, at block 530, after the mobile vacuuming robotic device has initiated a vacuuming operation, the home automation system may receive data via one or more sensors, such as a door sensor, indicating that the home or property is no longer unoccupied. Accordingly, the home automation system may process the input data and obtain new or revised action instructions indicating that the vacuuming operation should terminate, and may communicate the action instructions to the mobile vacuuming robotic device. Upon receipt of the new or updated action instructions, the mobile vacuuming robotic device may execute the action instructions by terminating the vacuuming operation, and may, for example, return to a charging station. Similarly, the mobile vacuuming robotic device, during the course of the vacuuming operation, may detect, for example via a motion sensor positioned on the robotic device, that a user has come home, and may derive updated action instructions indicating that the vacuuming operation should be terminated. The mobile vacuuming robotic device may execute the updated action instructions by terminating the vacuuming operation and may, for example, return to a charging station. In this way, existing mobile robotic devices need not be limited to predetermined functionality schedules, but may instead be updated based on changing property circumstances.

Figure 6:
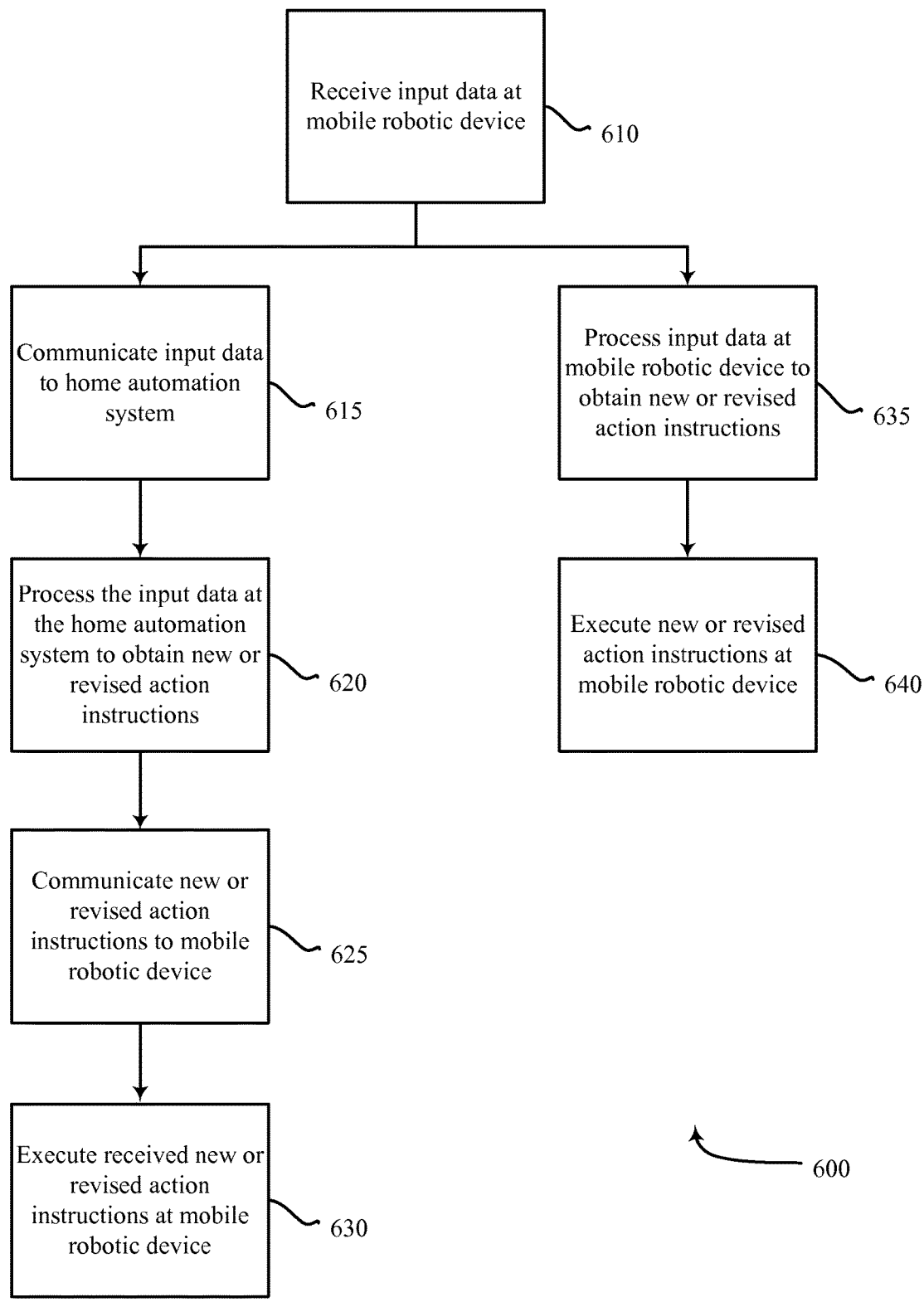
FIG. 6 is a flow diagram illustrating a method for receiving input data at a mobile robotic device of FIG. 1 according to various embodiments.

FIG. 6 is a flow chart illustrating an example method 600 of receiving input data at the mobile robotic device, as discussed above. At block 610, the method 600 may include receiving input data at the mobile robotic device. For example, one or more sensors positioned on or integrated with the mobile robotic device may detect a plurality of home security, environment, occupancy or other relevant property data. The input data received at the mobile robotic device may be collected on an ongoing basis, at intervals, or in some embodiments may be collected at the direction of the home automation system.

At block 615, the method 600 may include communicating the inputted data to the home automation system. As previously discussed, the inputted data may be communicated to the home automation system via a wired or wireless communication link, or alternatively may be communicated to the home automation system via a remote computing system and server.

At block 620, the method 600 may include processing the inputted data at the home automation system to obtain new or revised action instructions. For example, as discussed in a previous example, a mobile lawn mowing robotic device may detect, via one or more sensors, that it has begun to rain. The collected climate data may be communicated to the home automation system, which may obtain new or revised action instructions indicating that the mobile lawn mowing robotic device should terminate the lawn mowing operations.

At block 625, the method 600 may include communicating the new or revised action instructions to the mobile robotic device, and at block 630, the mobile robotic device may execute the new or revised action instructions. In the present example, the mobile robotic device may receive the new or revised action instructions from the home automation system and may terminate the lawn mowing operation and may, in some embodiments, return to a base or charging station.

Alternatively or in addition to the above described embodiment, after the input data is received at the mobile robotic device at block 610, the inputted data may be processed locally at the mobile robotic device at block 635 in order to obtain new or revised action instructions. At block 640, the method 600 may then include executing the new or revised action instructions at the mobile robotic device.

In an alternative embodiment, input data may be received at the remote computing device (as illustrated in FIG. 1). For example, a user may indicate that he has returned home via a manual or sensor-based (for example GPS) input into a dedicated application on his smart phone or other remote computing device. In another embodiment, weather forecasting data received at the remote computing device via the dedicated application may indicate that rain is forecasted in the coming hour. This user- or application-inputted data may be communicated from the remote computing device to the home automation system and/or the mobile robotic device such that new or revised action instructions may be obtained, and may be executed by the mobile robotic device.

Figure 7:
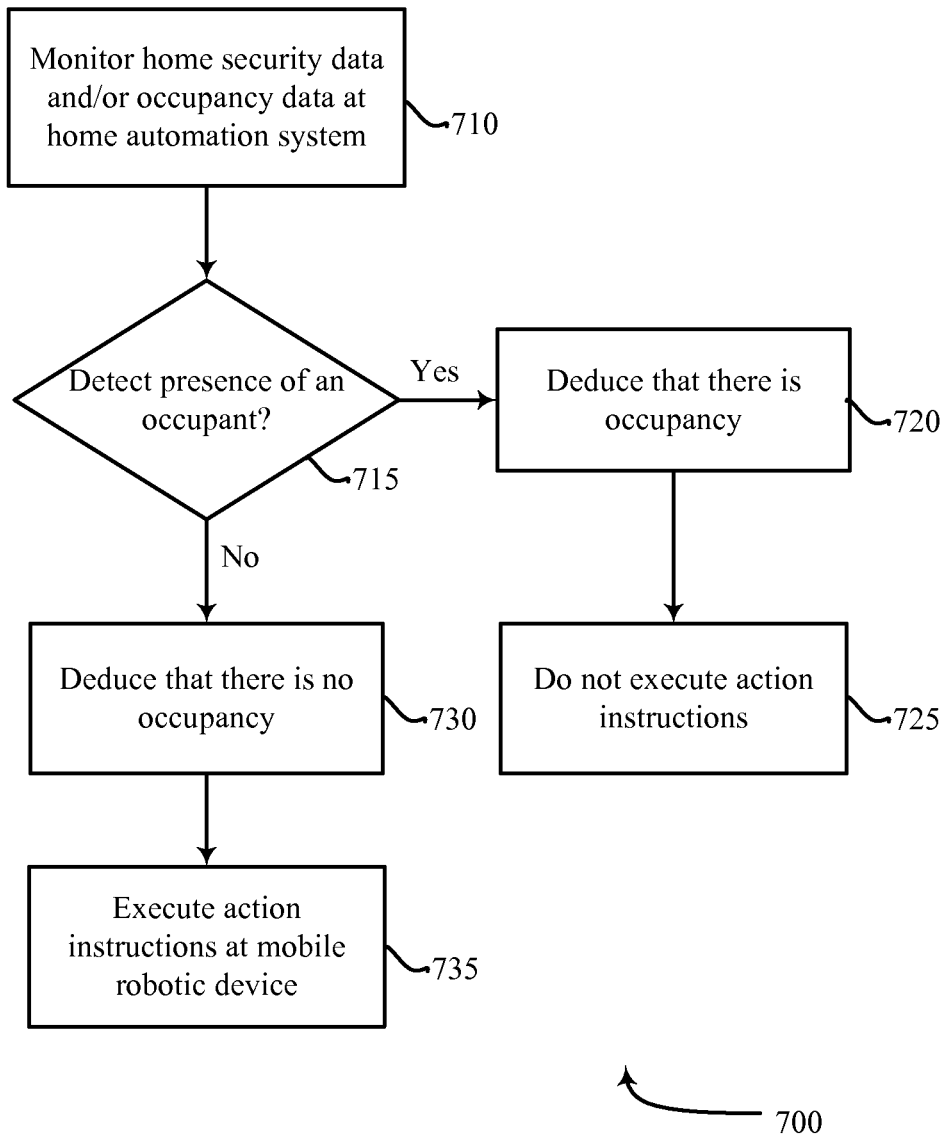
FIG. 7 is a flow diagram illustrating a method of monitoring home security data in determining whether to perform action instructions using a home automation system and mobile robotic device of FIG. 1 according to various embodiments.

FIG. 7 is a flow chart illustrating an example of a method 700 of receiving home occupancy data and executing derived operating instructions accordingly. For clarity, the method 700 is described below with reference to aspects of one or more of the home automation system 110, one or more sensors 115, network 130, remote computing device 135, and/or mobile robotic device 125 described with reference to FIGS. 1-3. In some examples, remote computing device 135 and/or mobile robotic device 125 may execute one or more sets of codes to control the functional elements of the remote computing device or mobile robotic device to perform the functions described below.

At block 710, the method 700 may include monitoring home security data, occupancy data, or other property-related data at the home automation system. As previously described, this monitoring may comprise monitoring threshold sensors, utilizing motion sensors, or collecting video recording data. Home security data and/or occupancy data may be monitored and collected by one or more sensor units, or alternatively may be inputted by a home owner at the remote computing device. In some embodiments, home security data and/or occupancy data may be collected by the mobile robotic device.

At block 715, the method 700 may include determining whether the presence of an occupant is detected in the home. Again, this occupancy may be determined by any number or combination of sensor units, including motion detectors, video monitors, and threshold sensors. If, at block 715, it is determined that there is occupancy in the house at block 720, then at block 725 no action instructions will be executed. For example, action instructions may include instructions to vacuum the house, but may be limited only to times during which the home or property is unoccupied. The determination that there is occupancy and therefore that action instructions should not be executed may be performed at the home automation system, at the mobile robotic device, or at a combination of the two. For example, in one embodiment, the mobile robotic device may collect the data indicating that the home is occupied, and may transmit this data to the home automation system, where the home automation system will determine, based on a predetermined rule, that no action instructions should be transmitted and/or executed at this time.

If, in the alternative, at block 715 no occupant presence is detected, at block 730 of the method 700, it may be deduced that there is no occupancy on the property, and accordingly at block 735, the action instructions may be executed at the mobile robotic device. Again, the action instructions may be dependent upon a predetermined, user-selected rule indicating that, for example, the home should only be vacuumed when unoccupied. Thus, when data is collected, at either one or more of the sensor units or at the mobile robotic device itself, indicating that the home is unoccupied, action instructions that a vacuum function should be performed may be derived at either the home automation system or the mobile robotic device, and the mobile robotic device may execute the vacuuming action instructions accordingly.

In other embodiments, the data monitored at block 710 may include, for example, climate data to determine whether it is raining, such that action instructions may be derived for a mobile robotic device having lawn mowing functionality to execute lawn mowing action instructions accordingly.

Figure 8:
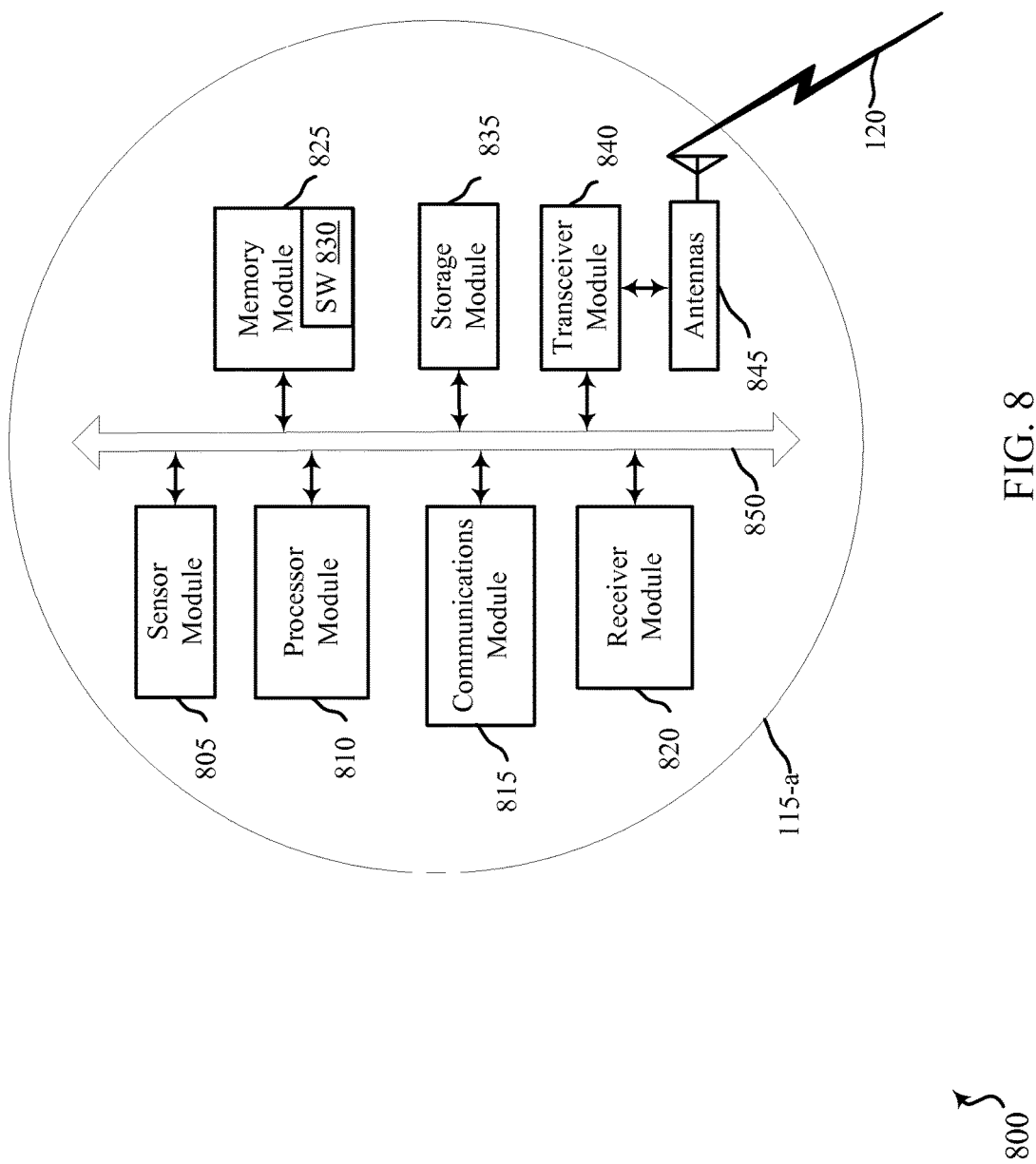
FIG. 8 is a block diagram of an example of a sensing apparatus for receiving home security and climate data in accordance with various embodiments.

FIG. 8 shows a block diagram 800 of a sensor unit 115-*a* for use in collecting home security, occupancy, and other property-related data, in accordance with various aspects of the present disclosure. The sensor unit 115-*a* may have various configurations. The sensor unit 115-*a* may, in some examples, have an internal power supply (not shown), such as a small battery, to facilitate mobile operation. In some examples, the sensor unit 115-*a* may be an example of one or more aspects of one of the sensor units 115 described with reference to FIG. 1. The sensor unit 115-*a* may be configured to implement at least some of the features and functions described with reference to FIG. 1.

The sensor unit 115-*a*, which may include one or more aspects of sensor unit 115 (as described in FIG. 1), may include a sensor module 805, a processor module 810, a memory module 825, a communications module 815, at least one transceiver module 840, at least one antenna (represented by antennas 845), a storage module 835, and/or a receiver module 820. Each of these components may be in communication with each other, directly or indirectly, over one or more buses 850.

The memory module 825 may include random access memory (RAM) or read-only memory (ROM). The memory module 825 may store computer-readable, computer-executable software (SW) code 830 containing instructions that are configured to, when executed, cause the processor module 810 to perform various functions described herein for communicating, for example, home occupancy data. Alternatively, the software code 830 may not be directly executable by the processor module 810, but may be configured to cause the sensor unit 115-*a* (e.g., when compiled and executed) to perform various of the functions described herein.

The processor module 810 may include an intelligent hardware device, e.g., a CPU, a microcontroller, an ASIC, etc. The processor module 810 may process information received through the transceiver module 840 or information to be sent to the transceiver module 840 for transmission through the antenna 845. The processor module 810 may handle, alone or in connection with the receiver module 820, various aspects of signal processing as well as determining and transmitting home security and environment data.

The transceiver module 840 may include a modem configured to modulate packets and provide the modulated packets to the antennas 845 for transmission, and to demodulate packets received from the antennas 845. The transceiver module 840 may, in some examples, be implemented as one or more transmitter modules and one or more separate receiver modules. The transceiver module 840 may support smart home data-related communications. The transceiver module 840 may be configured to communicate bi-directionally, via the antennas 845 and communication link 120, with, for example, mobile robotic device 125 and remote computing device 135 (via network 130 of FIG. 1). Communications through the transceiver module 840 may be coordinated, at least in part, by the communications module 815. While the sensor unit 115-*a* may include a single antenna, there may be embodiments in which the sensor unit 115-*a* may include multiple antennas 845.

Regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiments are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for communicating action instructions between a home automation system and a mobile robotic device, comprising:
   receiving, at the home automation system, a first set of input data;
   processing, at the home automation system, the first set of input data to automatically derive a first set of action instructions, wherein the first set of action instructions are associated with a retrofitted device, and wherein the retrofitted device comprises a protruding arm member having a magnet at a distal end, and wherein the first set of action instructions comprises instructions to position the mobile robotic device in front of an object to move at least a portion of the object via the magnet, attach the magnet to the object to be moved, and move the mobile robotic device with the magnet attached to the object;
   communicating the first set of action instructions to the mobile robotic device;
   processing, at the home automation system, the first set of input data to automatically derive a second set of action instructions, wherein the second set of action instructions are associated with a function of a second robotic platform; and
   communicating the second set of action instructions to the second robotic platform, wherein the second set of action instructions instruct the second robotic platform to execute the second set of action instructions in concert with the execution of the first set of action instructions by the mobile robotic device.

2. The method of claim 1, further comprising:
   receiving, at the home automation system, one or more data patterns, the one or more data patterns comprising user patterns of behavior.

3. The method of claim 2, wherein processing the first set of input data further comprises:
   obtaining, at the home automation system, an operation rule based on the received one or more data patterns, the operation rule comprising the first set of action instructions based on the received one or more data patterns.

4. The method of claim 3, further comprising:
   communicating the operation rule comprising the first set of action instructions to the mobile robotic device, wherein the mobile robotic device executes the first set action instructions.

5. The method of claim 1, further comprising:
   receiving, at the mobile robotic device, a third set of input data; and
   communicating the third set of input data to the home automation system.

6. The method of claim 1, wherein the first set of action instructions executed by the mobile robotic device are selected from any one of opening and closing a barrier of a home, vacuuming, mowing a lawn, activating and deactivating an alarm clock, relocating to a source of an alarm, activating video and/or audio recording or communication, and locating an individual or object, or a combination thereof.

7. The method of claim 1, wherein receiving the first set of input data comprises:
   receiving, at the home automation system, user input.

8. The method of claim 1, wherein receiving the first set of input data comprises:
   receiving, at the home automation system, home security data further comprising at least occupancy data, the home security data being received via one or more sensors of the home automation system.

9. The method of claim 8, wherein one or more sensors comprise any one of a microphone, a motion detector, a climate detector, a touch sensor, an optical sensor, a voice recognition sensor, a security camera, a mobile device, or combinations thereof.

10. The method of claim 1, wherein the first set of data comprises an indication of an increase in a number of visitors at a home environment; and
    wherein the action instructions comprise an instruction for the mobile robotic device to increase a vacuuming action.

11. The method of claim 1, wherein the protruding arm member has a pushing or turning operability.

12. The method of claim 1, wherein the first set of action instructions instructs the mobile robotic device to perform an action with the retrofitted device.

13. The method of claim 1, wherein the first set of action instructions comprise instructions to position the mobile robotic device in range of a device capable of communicating with a wireless communication protocol, and transmitting a set of communications to the device over the wireless communication protocol.

14. An apparatus for communicating action instructions between a home automation system and a mobile robotic device, comprising:
    a receiver for receiving, at the home automation system, a first set of input data;
    a processor for automatically deriving, at the home automation system, a first set of action instructions from the first set of input data received;
    the processor further for processing the first set of input data to automatically derive a second set of action instructions, wherein the second set of action instructions are associated with a function of a second robotic platform, wherein the first set of action instructions are associated with a retrofitted device, and wherein the retrofitted device comprises a protruding arm member having a magnet at a distal end, and wherein the first set of action instructions comprises instructions to position the mobile robotic device in front of an object to move at least a portion of the object via the magnet, attach the magnet to the object to be moved, and move the mobile robotic device with the magnet attached to the object;
    a memory in electronic communication with the processor, wherein the first set of action instructions are stored in the memory; and
    a transmitter to communicate the first set of action instructions from the memory to the mobile robotic device and the second set of action instructions to the second robotic platform, wherein the second set of action instructions instruct the second robotic platform to execute the second set of action instructions in concert with the execution of the first set of action instructions by the mobile robotic device.

15. The apparatus of claim 14, wherein the first set of input data received comprises any one of user input, home security data, and occupancy data, the input data being received via one or more sensors of the home automation system, and wherein the one or more sensors comprise any one of a microphone, a motion detector, a climate detector, a touch sensor, an optical sensor, a voice recognition sensor, a security camera, a mobile device, or combinations thereof.

16. The apparatus of claim 14, wherein the first set of action instructions executed by the mobile robotic device are selected from any one of opening and closing a barrier of a home, vacuuming, mowing a lawn, activating and deactivating an alarm clock, relocating to a source of an alarm, activating video and/or audio recording or communication, and locating an individual or object, or a combination thereof.

17. The apparatus of claim 14, wherein the mobile robotic device receives the first set of action instructions via any one of a sensing device attached to the mobile robotic device or a wireless received integrated with the mobile robotic device.

18. A mobile robotic device, comprising:
one or more sensors configured to:
    detect a first set of input data; and
a processor configured to allow the mobile robotic device to operate independently, and further configured to:
    communicate the first set of input data to a home automation system;
    receive one or more action instructions from the home automation system, wherein the first set of action instructions are associated with a retrofitted device, and wherein the retrofitted device comprises a protruding arm member having a magnet at a distal end, and wherein the first set of action instructions comprises instructions to position the mobile robotic device in front of an object to move at least a portion of the object via the magnet, attach the magnet to the object to be moved, and move the mobile robotic device with the magnet attached to the object; and
    execute the one or more action instructions in concert with an execution of a second set of action instructions by a second robotic platform.

* * * * *